May 20, 1930.  W. S. FISHER  1,759,447
INTERNAL COMBUSTION ENGINE OIL STRAINER
Filed May 31, 1927
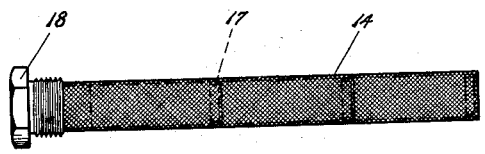
Fig. II.
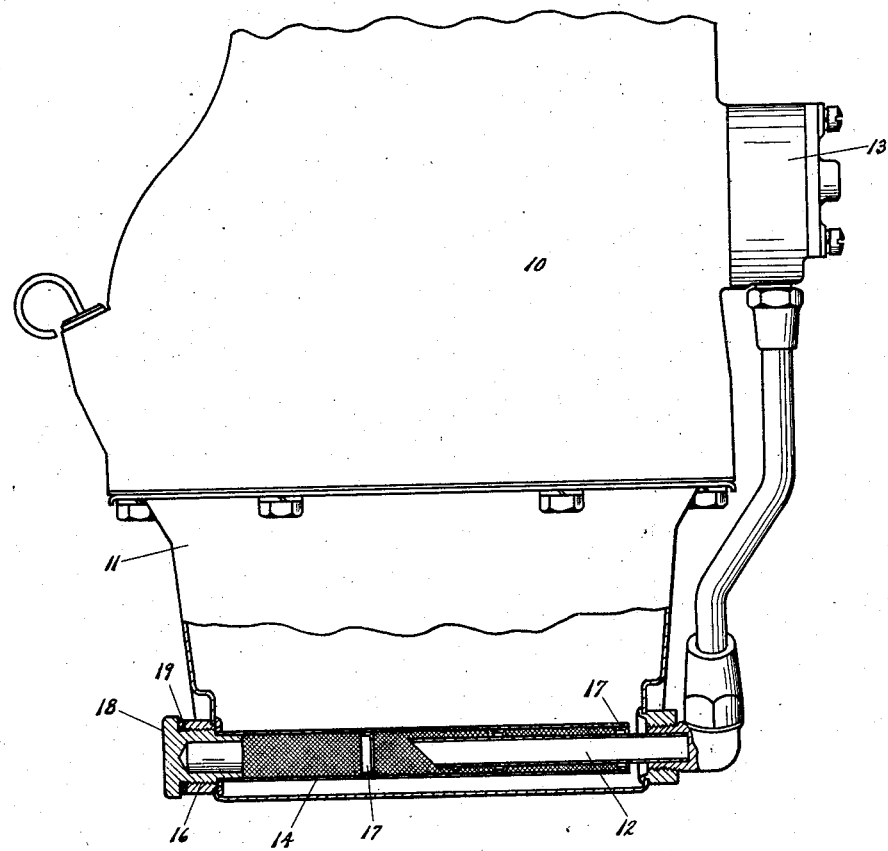
Fig. I.
INVENTOR.
WALTER S. FISHER
BY Chester H. Broselton
ATTORNEY.

Patented May 20, 1930

1,759,447

UNITED STATES PATENT OFFICE

WALTER S. FISHER, OF TOLEDO, OHIO, ASSIGNOR TO THE WILLYS-OVERLAND COMPANY, OF TOLEDO, OHIO, A CORPORATION OF OHIO

INTERNAL-COMBUSTION-ENGINE OIL STRAINER

Application filed May 31, 1927. Serial No. 195,241.

My invention relates to the lubricative system for automobiles, and has particular relation to straining means for oil withdrawn from the pan of the engine.

One object of the invention is to provide an inexpensive yet convenient and readily replaceable screen structure for the oil withdrawal tube in the oil pans.

It is a further object of this invention to provide a straining mechanism which may be positioned accurately without initially removing any of the mechanical elements constituting the crankcase of the engine.

An additional object of the invention resides in the provision of a replaceable screen for the lubricative system of automobiles which is not exposed to the upwardly projected hazards of a road bed.

According to my invention I have provided a tubular screen having several reinforcing washers along its length and a threaded supporting plug at one end, the other end being open. This screen is adapted to be screwed into the lateral portion of a crankcase and to enclose about an oil withdrawal tube that is aligned with the aperture and extends a short distance co-axially thereof. The screen slides over the tube, fitting the same accurately whereby oil drawn into the tube is made to pass through the screen.

A better understanding of the invention may be had by referring to the drawings, in which Figure I is an elevational view partly in section, illustrating a combination of the screen element with the oil pan or crankcase portion of an internal combustion engine, which may be preferred, and Fig. II is a plan view of the screen illustrated in section in Fig. I.

The crankcase includes a portion of the cylinder casting member 10 having an open base to which there is bolted an oil pan 11, wherefrom oil is withdrawn through a tube 12 by means of a pump 13 that supplies the lubricant to the various elements of the engine. In order to prevent circulation of deleterious matters of an organic and inorganic nature, a screen 14 is interposed in the lubricative system.

According to the present invention the oil withdrawal tube 12, one end of which is tapered projects into the pan, and is supported by the lateral portion of the pan alone. An aperture is provided on the opposite side of the oil pan which is co-axial with the tube, and includes a threaded nut 16 to receive and support the tubular screen member. The screen includes a plurality of spaced reinforcing washer members 17 whose internal diameter is substantially that of the tube. The projected end of the screen slides over the tapered portion of the tube 12 in closely fitted relation. In the other end of the tube there is disposed a threaded plug 18 which meshes with the nut 11. By reason of the closely fitted relation which exists between the end washer member 17 and the tube 12, any oil which is withdrawn through the tube must previously have passed through the screen member. It will be noted that to replace the screen requires only that the plug 19 be unscrewed and the screen which is rigidly secured thereto, withdrawn. A new screen may subsequently be inserted into position or the old screen replaced after it has been inspected and cleaned. In order to insure a seal between the nut 16 and the plug 18, a washer or gasket 19 may be interposed therebetween in the manner illustrated.

It will be observed that by tapering the end of the tube the difficulties which might normally be encountered in inserting a screen member are practically obviated. Moreover, the operations involved in the replacement of a screen are few and these require but little experience of skill to perform.

Although there is described but a single embodiment of the principles underlying the present invention, the invention is not so limited, but may be extended to include other embodiments without departing from its scope, and I desire therefore, that it be limited only as indicated in the appended claims.

I claim:

1. The combination of an oil pan having a bottom and side walls for an automobile engine having a horizontal oil withdrawal tube supported by one of said side walls, and an aperture in the opposite side wall in alignment with the tube, a removable tubular screen adapted to be inserted through the aperture, said screen being cooperatively disposed with respect to the tube whereby oil withdrawn from the pan passes therethrough.

2. The combination of an oil pan for an automobile engine having a horizontal oil withdrawal tube disposed in the lower portion thereof, and an aperture co-axial of the tube, a removable tubular screen projected through the aperture adapted to enclose about the tube, said screen having a spacing member in the end thereof in slidable engagement with the tube adapted to close the space between the tube and screen whereby oil withdrawn from the pan passes through the screen.

3. The combination of an oil pan for an automobile engine having an aperture therein, a horizontal oil withdrawal tube disposed in the lower portion of the pan, said tube being coaxial of the aperture and including a tapered end, a removable tubular screen adapted to be inserted through the aperture and supported thereby, said screen being provided with spaced reinforcing means at the inner end thereof, said spacing means closing the annular space between the tube and screen and adapted to closely engage the tube whereby oil withdrawn from the pan passes through the screen.

In testimony whereof, I affix my signature.

WALTER S. FISHER.